(12) United States Patent
Yu et al.

(10) Patent No.: US 11,370,661 B2
(45) Date of Patent: Jun. 28, 2022

(54) OZONE GENERATING MACHINE FOR USE IN A SHIP

(71) Applicant: SUEZ GROUPE, Paris la Defense (FR)

(72) Inventors: Hua Long Yu, Wuqing Development Area (CN); Scott Christie Taylor, Aocheng Area (CN); Bruno Steinlin, New Jersey, NJ (US); Tito Scherrer, Rueschlikon (CH); Luca Ramoino, Uster (CH)

(73) Assignee: E2INTERACTIVE, INC., Atlanta, GA (US)

( * ) Notice: Subject to any disclaimer, the term of this patent is extended or adjusted under 35 U.S.C. 154(b) by 0 days.

(21) Appl. No.: 16/622,926

(22) PCT Filed: Jun. 29, 2018

(86) PCT No.: PCT/EP2018/067520
§ 371 (c)(1),
(2) Date: Dec. 16, 2019

(87) PCT Pub. No.: WO2019/002530
PCT Pub. Date: Jan. 3, 2019

(65) Prior Publication Data
US 2020/0156940 A1    May 21, 2020

(30) Foreign Application Priority Data
Jun. 30, 2017   (EP) ..................... 17305836

(51) Int. Cl.
*C01B 13/11*    (2006.01)
*B63J 4/00*    (2006.01)

(52) U.S. Cl.
CPC ............... *C01B 13/11* (2013.01); *B63J 4/002* (2013.01); *C01B 2201/12* (2013.01); *C01B 2201/20* (2013.01); *C01B 2201/30* (2013.01)

(58) Field of Classification Search
CPC . C01B 13/11; C01B 2201/12; C01B 2201/20; C01B 2201/30; C01B 2201/74;
(Continued)

(56) References Cited

U.S. PATENT DOCUMENTS

| 2,155,675 A |   | 4/1939 | Napier |
| 3,253,201 A | * | 5/1966 | Slatkin ................. B24D 11/005 361/233 |

(Continued)

FOREIGN PATENT DOCUMENTS

| EP | 2913307 A4 | 7/2016 |
| JP | 2000009293 A | 1/2000 |
| JP | 2001173408 A | 6/2001 |

OTHER PUBLICATIONS

International Search Report completed Jul. 26, 2018; 3 pages.

*Primary Examiner* — Xiuyu Tai
(74) *Attorney, Agent, or Firm* — Landmark Intellectual Property Law, LLC; Gregory M Murphy

(57) ABSTRACT

Ozone generating machine for generating ozone in a ship, including: an ozone generator (OG), a liquid cooling circuit portion, a frame, comprising a base (B) for laying on the ground, a top subframe (TSF) supporting the ozone generator (OG), and at least one pair of pillars (P) arranged between the base (B) and the top subframe (TSF), characterized in that the frame comprises: at least one pair of cross-brace beams (CB), for linking the pillars (P) and a plurality of dampers (D) attached to a bottom of the base (8).

13 Claims, 3 Drawing Sheets

(58) Field of Classification Search
CPC ............ C01B 2201/90; C01B 2201/62; C01B 13/115; C01B 13/10; C01B 2201/22; C01B 2201/40; C01B 2201/70; C01B 2201/34; B01J 19/08; B01J 19/088; B01J 2219/0849; A61L 2/202; A61L 9/015; A61L 9/20; C02F 1/4672; C02F 1/78; C02F 2303/04; C02F 2103/008; C02F 3/00; C02F 1/4676; C02F 2103/06; C02F 2305/02; B63J 4/002; B63J 2/02; B01F 3/04503; B01F 5/045; B01F 2003/04886; B01F 2003/04858; B63B 13/00; B09C 1/002

See application file for complete search history.

(56) References Cited

U.S. PATENT DOCUMENTS

| | | | | |
|---|---|---|---|---|
| 6,279,589 | B1* | 8/2001 | Goodley | B08B 9/0936 134/102.1 |
| 2006/0045826 | A1* | 3/2006 | Mullaney | C01B 13/11 422/186.22 |
| 2008/0031770 | A1* | 2/2008 | Heselton | C01B 13/10 422/4 |
| 2014/0224648 | A1* | 8/2014 | Andrews | C02F 1/4672 204/252 |

\* cited by examiner

OZONE GENERATING MACHINE FOR USE IN A SHIP

RELATED APPLICATIONS

The present application is a national phase application based on PCT/EP2018/067520, filed on 29 Jun. 2018, which in turn claims priority to European Patent Application No. 17305836.3, filed on 30 Jun. 2017.

BACKGROUND OF THE INVENTION

The present invention relates to an ozone generating machine comprising an ozone generator with at least two electrodes separated by an ozonizing gap and a dielectric layer, and coupled to an electric power unit to generate electric discharges in a gas containing dioxygen and flowing in the 5 ozonizing gap. In particular, the invention relates to such ozone generating machine designed for use in a ship, where operating conditions are specific and severe: movements/vibrations, available space, temperature, humidity . . . . As an example, such ozone generating machine might be used to treat/sanitize the water contained in the ballasts of the ship or vessel.

Document US872840282 describes an example of ozone generating machine comprising at least two electrodes arranged in an ozone generator which is water cooled. However, this document does not give any adequate solution for supplying an ozone generating machine suitable for long and safe use in a ship with severe operating conditions.

BRIEF SUMMARY OF THE INVENTION

The present invention aims to address the above mentioned drawbacks of the prior art, and to propose first an ozone generating machine designed for long and safe use in severe operating conditions, as the ones found in a ship.

In this aim, a first aspect of the invention is an ozone generating machine for generating ozone in a ship, comprising:
- an ozone generator with at least two electrodes separated by an ozonizing gap and a dielectric layer, the ozone generator comprising at least a gas inlet for receiving a feed gas containing dioxygen, and a gas outlet for exhausting gas comprising ozone to an ozone circuit of the ship,
- a frame, comprising a base for laying on the ground, a top subframe supporting the ozone generator, and at least one pair of pillars arranged between the base and the top subframe, characterized in that the frame comprises:
- at least one pair of cross-brace beams, each beam of the cross-brace beams being attached to a top portion of a pillar of said at least one pair of 5 pillars and to a bottom portion of another pillar of said at least one pair of pillars,
- a plurality of dampers attached to a bottom of the base, for contacting the ground.

The ozone generating machine according to the above embodiment comprises a frame specially designed to resist to vibrations. Indeed, the cross-brace beams (such as counter brace, lattice beams or diagonal beams) linking together at least two pillars, contribute to an increased stiffness and resistance to vibrations. Such vibrations are stressing structures embarked on a ship. In case of an ozone generating machine, the ozone generator (a housing comprising electrodes, a liquid cooling portion and a coolant) represents a heavy and bulky component (typically Ø (300-800] mm and [800-3000] mm length), located usually at chest height for maintenance reasons which has to be supported by the frame. Such load, at chest height, when the base is subjected to vibrations, stresses the frame, resulting in strains and displacements which can affect long term integrity. The crossbrace beams and dampers contribute to enhance the resistance to vibrations of the machine.

Advantageously, the ozone generating machine comprises a liquid cooling circuit portion, with at least a cooling path in the ozone generator, to be connected with a cooling circuit of the ship. This allows an efficient temperature control of the ozone generator, and the liquid cooling circuit portion is to be connected to a cooling circuit of the vessel, to form an integrated machine.

Advantageously, a perpendicular projection on the base of said at least one pair of cross-brace beams is comprised within a perpendicular projection on the base of the ozone generator. In other words, when the machine lies onto a horizontal ground, the cross-brace beams are below or under the ozone generator (within the projection on ground of the ozone generator housing). This construction avoids cantilever or overhanging and minimizes the stress of the frame.

Advantageously, the frame comprises at least one top reinforcing plate attached to a top portion of a pillar and to the top subframe, and/or at least one bottom reinforcing plate attached to a bottom portion of a pillar and to the base. Such reinforcing plates enhance the rigidity of link between the pillar extremities and the frame top or bottom portion. Said top/bottom reinforcing plate is perpendicular to the base, or to the ground.

Advantageously, said at least one top reinforcing plate is attached to a top portion of a pillar with two attachment points and to the top subframe with two attachment points, and/or at least one bottom reinforcing plate is attached to a bottom portion of a pillar with two attachment points and to the base with two attachment points. Typically, the attachment points are bolts, nuts or screws.

Advantageously, each beam of the cross-brace beams is attached to the top portion of a pillar via a top reinforcing plate and to the bottom portion of another pillar via a bottom reinforcing plate. Such design with reinforcing plates attached to the frame, the pillar and the cross-brace beam enhances the rigidity of link between the pillar extremities and the frame top or bottom portion.

Advantageously, the beams of the cross-brace beams are attached together in an area where there are facing together. This limits the relative movements.

Advantageously, the ozone generator presents an axial length defining an axial direction, the axial direction being parallel to a base plane defined by the base, and an axial length of each beam of said at least one pair of cross-brace beams is parallel to a longitudinal plane being parallel to the axial direction and perpendicular to the base plane. In other words, the cross-brace beams are longitudinally aligned with the ozone generator. In particular, when the ozone generator housing is cylindrical, it is parallel to the ground, and the cross-brace beams are linking the pillars in the longitudinal direction of the machine, thereby limiting the deformations to the frame in its longest dimension, where it is the most critical.

Advantageously, the ozone generating machine comprises two pairs of pillars, each pair of pillars being equipped with one pair of cross-brace beams, with each beam of the cross-brace beams being attached to a top portion of a pillar of one pair of pillars and to a bottom portion of another pillar of said pair of pillars Advantageously, an axial length of each beam of each pair of crossbrace beams is parallel to a longitudinal plane being parallel to the axial direction and perpendicular to the base plane.

Advantageously, the ozone generating machine comprises: at least one electric device such as a transformer or a converter attached to a top face of the base, and one opening in the frame to allow removal/installation of the electric device, said opening being perpendicular to the axial direction. The two pair of crossbrace beams are aligned in the longitudinal direction between the pillars, in the bottom portion of the machine. The electric device, heavy component, is also located in the bottom portion of the machine. To simplify maintenance, the machine comprises a transverse opening, allowing replacement of the electric device without any interference with the cross-brace beams: the electric device is translated parallel to the longitudinal direction through the opening. Typically, the opening is closeable with a door, to ensure tightness, as required in marine environment.

Advantageously, said at least one electric device is arranged between the two pairs of cross-brace beams.

Advantageously, a perpendicular projection on the base of said at least four dampers is comprised within a perpendicular projection on the base of the ozone generator. In other words, when the machine lies onto a horizontal ground, at least four dampers are below or under the ozone generator (within the projection on ground of the ozone generator housing). This construction avoids cantilever, or overhanging and minimizes the stress of the frame.

Advantageously, at least one of the plurality of dampers is arranged to be attached to the ground of the ship. This avoids sliding, slipping or even falling over of the machine when the ship tilts (up to 30°).

Advantageously, the ozone generating machine comprises at least two intermediate dampers, arranged between the ozone generator and the top subframe. Such intermediate dampers arranged between the ozone generator and the rest of the ozone generating machine minimize the displacements of the ozone generator, when the frame is subjected to vibration.

In an embodiment, the electrodes are metallic, and the dielectric layer comprises a ceramic coating, applied onto at least one of the electrodes.

A second aspect of the invention relates to a ship, comprising an ozone generating machine according to the first aspect of the invention.

BRIEF DESCRIPTION OF THE DRAWINGS

Other features and advantages of the present invention will appear more clearly from the following detailed description of particular non-limitative examples of the invention, illustrated by the appended drawings where.

DETAILED DESCRIPTION OF THE INVENTION

Figure 1:
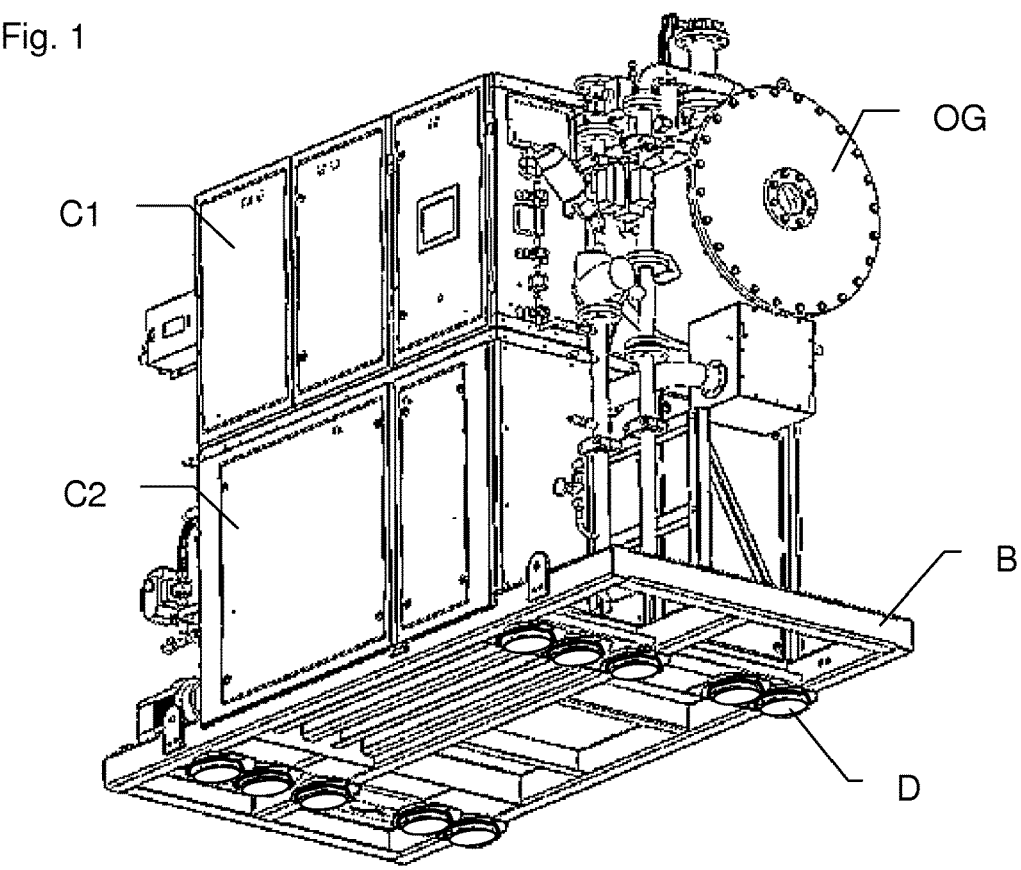
FIG. 1 represents a perspective view of an ozone generating machine according to the invention.
Figure 2:
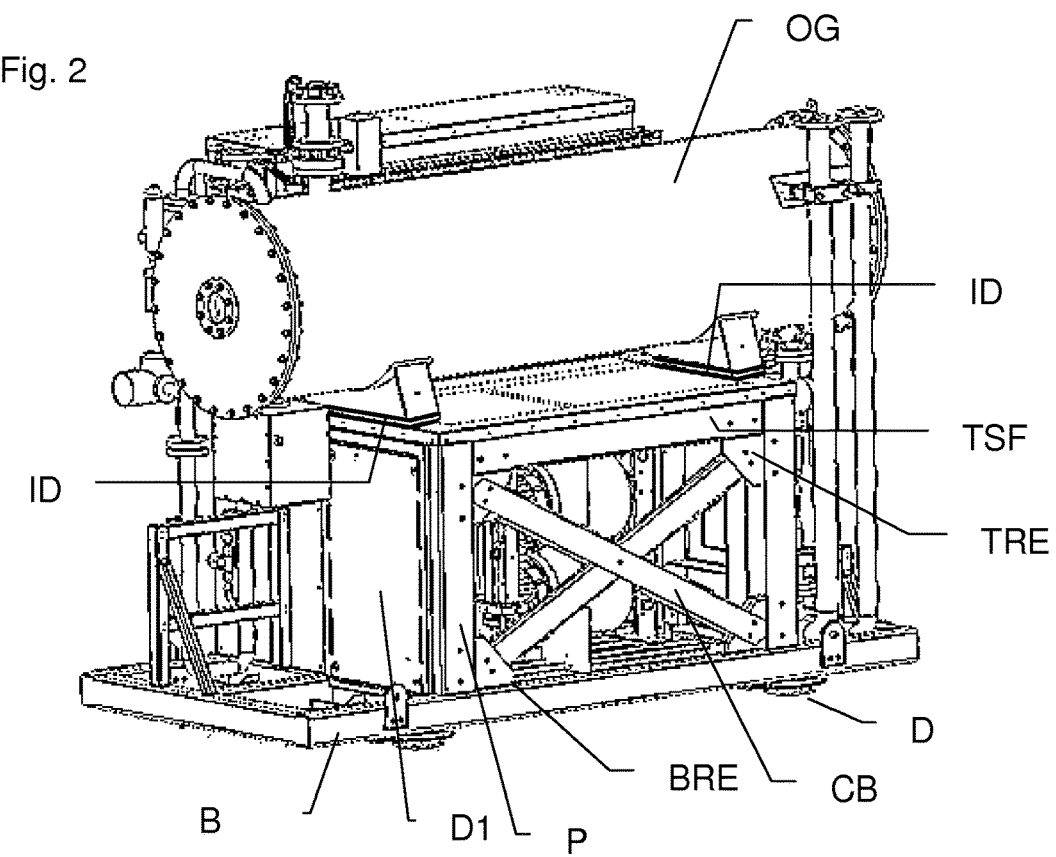
FIG. 2 represents a second perspective view of the ozone generating machine of FIG. 1, with some external doors not shown, to show internal frame structure.
Figure 3:
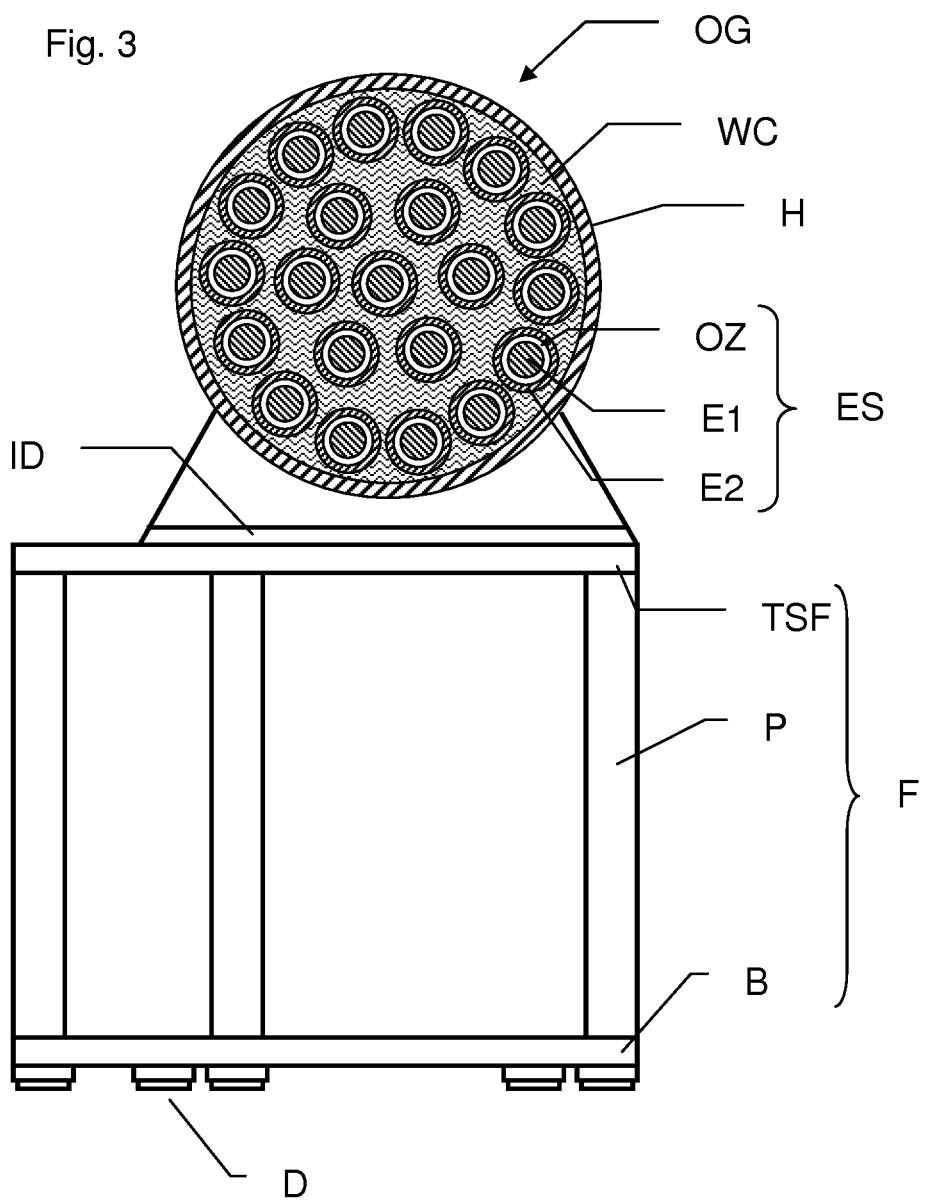
FIG. 3 represents a simplified cross section of the ozone generator of the machine of FIG. 1.

The ozone generating machine shown on FIGS. 1, 2 and 3 mainly comprises an ozone generator OG, two electric cabinets C1 and C2, and a 5 frame F for supporting the ozone generator OG and the electric cabinets C1, C2. Of course, such machine comprises also numerous valves, sensors, pipes, electric devices to ensure automatic generation of ozone.

Figure 5:
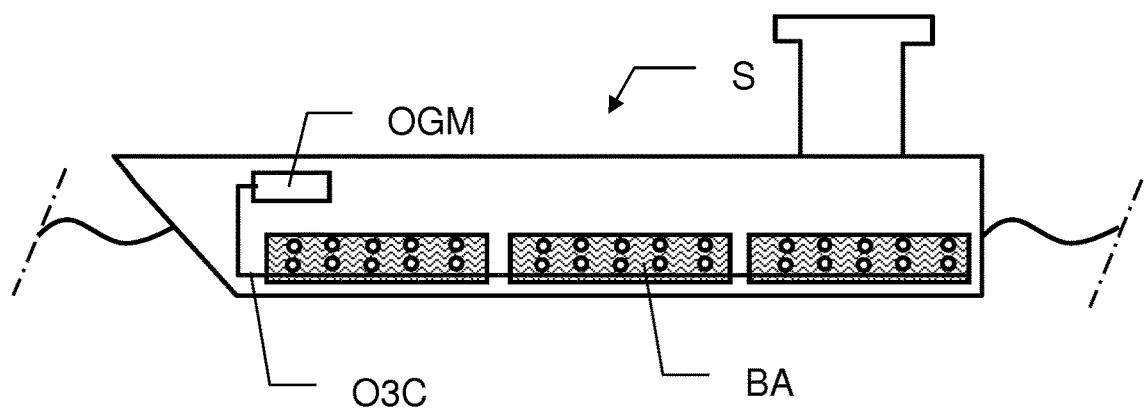
FIG. 5 represents a ship equipped with an ozone generating machine according to the invention.

In particular, the depicted machine is designed for use in ships or vessels, having a need to sanitize ballasts water, to avoid cross-harbor water contamination. FIG. 5 represents a ship S comprising ballasts BA (full of water) and an ozone generating machine OGM, connected to an ozone circuit O3C of the ship S, to supply ozone to the ballasts BA. Indeed, water contained in the ballasts BA need to be treated/sanitized before being released, and ozone is supplied by the ozone circuit O3C directly into the ballasts BA, where ozone bubbles are visible.

The ozone generator OG comprises a plurality of electrodes sets ES placed within a housing H, as shown on FIG. 3. Each electrodes set comprises two electrodes E1 and E2, separated by an ozonizing gap OZ, and a dielectric layer (not shown on figures for clarity). The ozone generating machine OGM comprises also an electric power unit EPU shown FIG. 4 for supplying electric current to each of the electrodes sets. Each ozonizing gap OZ is connected upstream to a gas inlet O2IN of the ozone generator OG for receiving a gas containing dioxygen, and downstream to a gas outlet O3OUT for exhausting gas containing ozone, when the ozone generating machine is 25 operated.

The gas containing dioxygen might be supplied by the ship network, a bottle, or might be air. When electric power is supplied to the electrodes and gas flow is established, electric discharges occur in the ozonizing gap OZ between the electrodes allowing corona affect, and a portion of oxygen supplied at the gas inlet O2IN is transformed into ozone, which is exhausted at the gas outlet O3OUT in a given amount.

To ensure stable conditions during production of ozone, a liquid cooling circuit comprises a cooling path within the ozone generator OG, so 5 that a cooling liquid can flow through the ozone generator OG, to cool directly each of the electrodes sets ES. FIG. 3 shows that cooling water WC is present in the housing H of ozone generator OG. The ozone generator comprises an inlet of water cooling WCIN, and an outlet of water cooling WCOUT.

Typically, the ozone generating machine OGM can be operated in the following ranges: (i) range of power density: [0.1 to 1 O] kW per square meter of electrode; (ii) range of electric current frequency: [10 to 30000] Hz; (iii) upper limit of peak voltage: [2-20] kV; (iv) Ozone concentration at the gas outlet: 1-16% by weight; (v) Range of absolute pressure of feed gas, [0.5 bar(a)-6.0 bar(a)].

It might be desired that Nitrogen (N2) and/or Argon (Ar) is present in the feed gas at least with a concentration of: 0.1-5% by weight, and the rest is dioxygen. Alternatively, one can supply air to the ozone generator OG.

Figure 4:
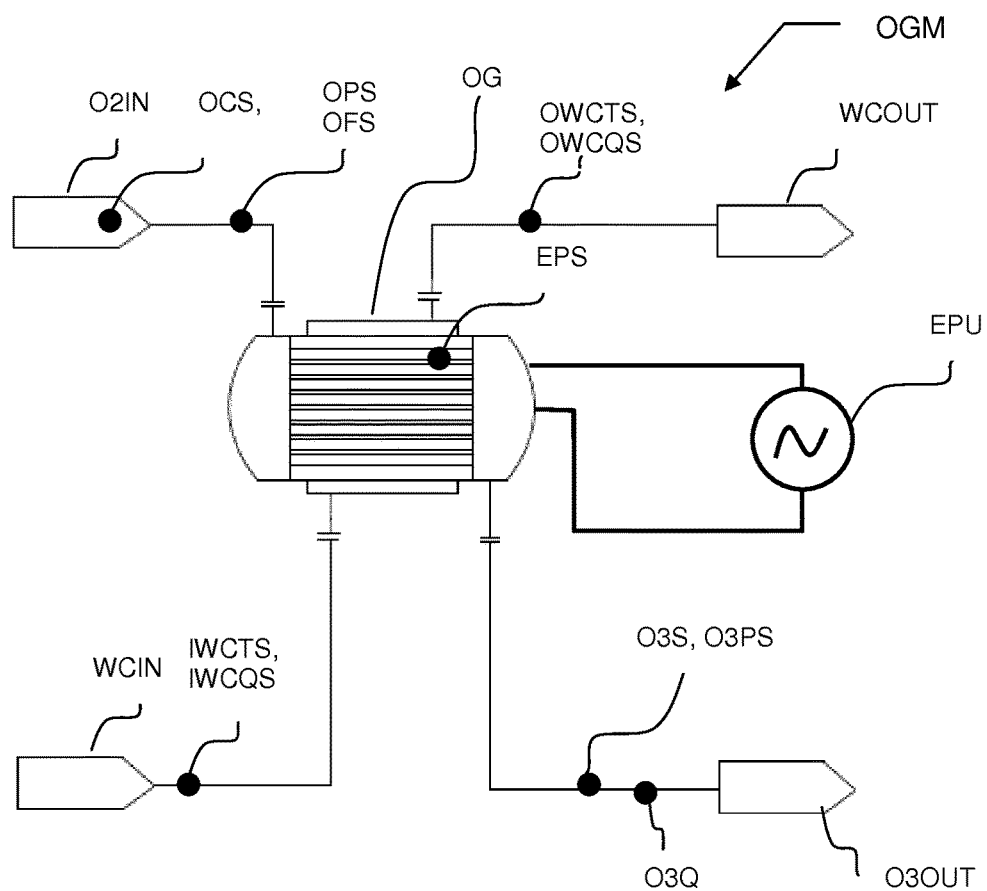
FIG. 4 represents a schematic diagram of the ozone generating machine of FIG. 1.

The ozone generating machine OGM is also equipped with adequate sensors to monitor and check the ozone production, and the machine can comprise, as shown on FIG. 4 an oxygen concentration sensor OCS, an oxygen pressure sensor OPS, an oxygen flow sensor OFS, an ozone concentration sensor O3S, an ozone pressure sensor O3PS, an ozone circulation flow sensor O3Q, an inlet water cooling temperature sensor IWCTS and an outletwater cooling temperature sensor OWCTS, an inlet water cooling flow sensor IWCQS and an outlet water cooling flow sensor OWCQS, electrode power measurement means EPS with for example an electrode intensity sensor, an electrode voltage sensor, and a frequency sensor.

The frame F supports the ozone generator OG via a top subframe TSF, lies onto the ground via a base B and comprises pillars P between the 5 top subframe TSF and base B.

Typically, the base B and top subframe TSF are metallic structures comprising welded beams and plates, to ensure adequate resting surfaces or platen areas, for attachment of the components of the ozone generating machine. Welding technique is an example of assembly, but the beams and plates might be attached together with nuts/bolts/screws, to allow easy dismantling/transportation/installation of the frame F. Indeed, as the ozone generating machine is designed to be installed into a ship, one shall take into account the installation in a reduced space, with limited access. This leads to choose between welding assembly for parts having small dimensions/footprint and nuts assembly for parts having larger dimensions/footprint.

Pillars P are supporting the top subframe TSF and are attached to the base B.

As shown FIGS. 1 and 2, the ozone generator OG is typically located at chest height (between 1 m and 1.6 m from ground), for maintenance reasons, to provide an easy access for the electrodes E1, E2 located within the ozone generator OG, as shown FIG. 3.

The weight and dimensions of the ozone generator OG are significant (Ø of about [300-800] mm and [800-3000] mm length, weight from 50 kg to 1500 kg), added to the weight of other organs of the ozone generating machine OGM (electric cabinets C1, C2, pipes, valves . . . ) results in stress, strain and displacements when the machine is subjected to vibrations, commonly present in a marine application.

As an example, it might be required that the electric cabinet C1, C2 or any component of the OGM has to fulfill a vibration range of 2 to 100 Hz vibration, and at the resonance frequency it is not allowed to have (as described in the D.N.V standard for certification No. 2.4 "Environmental test specification for instrumentation and automation equipment,". April 2006): (i) more than 1 mm displacement between 2 and 13.2 Hz; and (ii) more than 6860 mm/s$^2$ acceleration between 13.2 and 100 Hz, comparing the base frame to other parts especially on top of the ozone generating machine OGM.

In order to minimize the acceleration and/or displacements when subjected to vibrations, the frame F is designed in the specific following way. Cross-brace beams CB are positioned in the longitudinal direction of the machine, as shown on FIG. 2, to link pairs of pillars P located under the ozone generator OG. A first pair of cross-brace beams CB is visible FIG. 2, but another one is arranged still under the ozone generator OG, but at its other side. Consequently, the pillars P linked together by the cross-brace beams are firmly held together.

In addition, the frame F comprises reinforcing plates, and in particular top reinforcing plates TRE attached via two bolts to the top portion of the pillars P and via two bolts to the top subframe TSF, thereby increasing the rigidity of the joint. Similarly, bottom reinforcing plates BRE are attached via two bolts to the bottom portion of the pillars P and via two bolts to the base B, thereby increasing the rigidity of the joint.

The cross-brace beams are also attached via two bolts to the reinforcing plates, to provide a simple and robust structure.

In addition, dampers D are positioned between the ground and the 25 base B to minimize the transmission of vibrations to the frame F. At least four dampers D are placed directly below the ozone generator OG, but as shown FIG. 1, ten dampers total are attached to the bottom face of the base B.

Some of these dampers are directly attached to the ground, to prevent any relative movement between the ground and the ozone generating machine OGM (slippage, falling over . . . ).

The dampers D are chosen to have a low vertical size (less than 100 mm), and to resist to the weight of the machine. Typically, such dampers D are comprising a rubber arranged between a first attachment portion attached to the frame F, and a second attachment portion, attached to or laying onto the ground.

At least four dampers D are positioned vertically below the ozone generator OG, and intermediate dampers ID are placed between the ozone 10 generator OG and the top subframe TSF, to minimize as much as possible the vibrations of the heaviest part (the ozone generator OG) of the ozone generating machine OGM.

In addition, one should note that the cross-brace beams CB are positioned parallel to the longitudinal dimension of the ozone generating 15 machine OGM, defined by the axial direction of the ozone generator OG. Therefore organs or devices might be placed between the two pairs of crossbrace beams CB, and the machine comprises at least one door D1, for closing an opening in the frame F through which the organs or devices placed between the two pairs of cross-brace beams CB can be removed or inserted, for maintenance reasons. In particular, it is advantageous to position and attach in the bottom portion of the ozone generating machine OGM heavy electric devices such as current transformers or converters, to increase stability. The transverse door D1 and its opening, arranged large enough to allow passage of these devices, avoids the need to remove the cross-brace beams.

It is of course understood that obvious improvements and/or modifications for one skilled in the art may be implemented, still being under the scope of the invention as it is defined by the appended claims.

What is claimed is:

1. An ozone generating machine (OGM) for generating ozone in a ship, comprising:
    an ozone generator (OG) with at least two electrodes separated by an ozonizing gap (OZ) and a dielectric layer, the ozone generator (OG) comprising at least a gas inlet (O2IN) for receiving a feed gas containing dioxygen, and a gas outlet (O3OUT) for exhausting gas comprising ozone to an ozone circuit of the ship to supply ozone,
    a frame, comprising a base (B) for laying on the ground, a top subframe (TSF) supporting the ozone generator (OG), and at least one pair of pillars (P) arranged between the base (B) and the top subframe (TSF),
    characterized in that the frame comprises:
    at least one pair of cross-brace beams (CB), each beam of the cross-brace beams (CB) being attached to a top portion of a pillar (P) of said at least one pair of pillars (P) and to a bottom portion of another pillar (P) of said at least one pair of pillars (P),
    a plurality of dampers (D) attached to a bottom of the base (B), for contacting the ground.

2. The ozone generating machine (OGM) according to claim 1, wherein the base (B) is disposed such that when the ozone generating machine is horizontal, the at least one pair of cross-beams are under the ozone generator, wherein the ozone generator (OG) is configured to remain within a perpendicular projection of the base (B).

3. The ozone generating machine (OGM) according to claim 1, wherein the frame comprises at least one top reinforcing plate (TRE) attached to the top portion of the pillar (P) and to the top subframe (TSF), and/or at least one bottom reinforcing plate (BRE) attached to the bottom portion of the pillar (P) and to the base (B).

4. The ozone generating machine (OGM) according to claim 3, wherein said at least one top reinforcing plate (TRE) is attached to the top portion of a pillar (P) with two attachment points between the at least one top reinforcing plate and the pillar and to the top subframe (TSF) with two attachment points between the at least one top reinforcing plate and the top subframe, and/or at least one bottom reinforcing plate (BRE) is attached to the bottom portion of a pillar (P) with two attachment points between the at least one bottom reinforcing plate and the pillar and to the base (B) with two attachment points between the bottom reinforcing plate and the base.

5. The ozone generating machine (OGM) according to claim 3, wherein each beam of the cross-brace beams (CB) is attached to the top portion of the pillar (P) via the top reinforcing plate (TRE) and to the bottom portion of another pillar (P) via the bottom reinforcing plate (BRE).

6. The ozone generating machine (OGM) according to claim 1, wherein the ozone generator (OG) presents an axial length defining an axial direction, the axial direction being parallel to a base (B) plane defined by the base (B).

7. The ozone generating machine (OGM) according to claim 6, wherein, each pair of the pillars (P) is equipped with one pair of cross-brace beams (CB), with each beam of the cross-brace beams (CB) being attached to a top portion of a pillar (P) of one pair of the pillars (P) and to a bottom portion of another pillar (P) of the pair of pillars (P).

8. The ozone generating machine (OGM) according to claim 7, comprising:
   at least one electric device such as a transformer or a converter attached to a top face of the base (B), and
   one opening in the frame to allow removal/installation of the electric device, said opening being perpendicular to the axial direction.

9. The ozone generating machine (OGM) according to claim 8, wherein said at least one electric device is arranged between the two pairs of the cross-brace beams (CB).

10. The ozone generating machine (OGM) according to claim 1, comprising at least four dampers (D), wherein the at least four dampers (D) are disposed such that when the ozone generating machine is horizontal, the at least four dampers are under the ozone generator such that the ozone generator is configured to remain within a footprint of the at least four dampers.

11. The ozone generating machine (OGM) according to claim 1, wherein at least one of the plurality of dampers (D) is arranged to be attached to the ground of the ship.

12. The ozone generating machine (OGM) according to claim 1, comprising at least two intermediate dampers (ID), arranged between the ozone generator (OG) and the top subframe (TSF).

13. The ship (S), comprising the ozone generating machine (OGM) according to any one of the preceding claims.

* * * * *